United States Patent [19]

Domina

[11] 4,435,528
[45] Mar. 6, 1984

[54] CONCENTRATED EMULSIONS OF WATER-SOLUBLE POLYMERS

[75] Inventor: William G. Domina, Midland, Mich.

[73] Assignee: The Dow Chemical Company, Midland, Mich.

[21] Appl. No.: 333,139

[22] Filed: Dec. 21, 1981

[51] Int. Cl.$^3$ ............... C08L 33/02; C08L 33/26
[52] U.S. Cl. .................. 523/332; 523/336; 524/801; 524/827; 524/831
[58] Field of Search ............ 523/332, 336; 524/801, 524/827, 831

[56] References Cited

U.S. PATENT DOCUMENTS

| | | | |
|---|---|---|---|
| Re. 28,474 | 7/1974 | Anderson et al. | 524/555 |
| 3,284,393 | 11/1966 | Vanderhoff et al. | 526/207 |
| 3,624,019 | 11/1971 | Anderson et al. | 524/555 |
| 3,734,873 | 5/1973 | Anderson et al. | 523/336 |
| 3,826,771 | 7/1974 | Anderson et al. | 524/817 |
| 3,849,361 | 11/1974 | Zweigle | 523/332 |
| 3,957,739 | 5/1976 | Cabestany et al. | 526/240 |
| 4,021,399 | 5/1977 | Hunter et al. | 523/332 |
| 4,052,353 | 10/1977 | Scanley | 523/332 |
| 4,147,681 | 4/1979 | Lim et al. | 523/336 |
| 4,242,247 | 12/1980 | Pellon et al. | 524/801 |
| 4,252,706 | 2/1981 | Phillips et al. | 523/336 |
| 4,299,755 | 11/1981 | Keggenhoff et al. | 524/55 |

FOREIGN PATENT DOCUMENTS 1277577 6/1972 United Kingdom ............ 524/801

Primary Examiner—Ronald W. Griffin

[57] ABSTRACT

Stable concentrated water-in-oil emulsions of water-soluble polymers such as polyacrylamide are provided by concentrating a water-in-oil preconcentrate emulsion of the water-soluble polymer containing an inverting surfactant in an amount sufficient to reduce the bulk viscosity of the preconcentrate emulsion.

14 Claims, No Drawings

CONCENTRATED EMULSIONS OF WATER-SOLUBLE POLYMERS

BACKGROUND OF THE INVENTION

This invention relates to concentrated water-in-oil emulsions of water-soluble polymers wherein the emulsions can be inverted into a continuous aqueous phase. This invention also relates to processes for preparing such emulsions.

Various water-soluble polymers such as polyacrylamide and copolymers of acrylamide with other monomers are well-known to be precipitants or flocculants for many substrates including sewage, cellulosic fibers and fines for retention and freeness, effluent waste for metal production, coal tailings and the like. Such polymers are also known to exhibit superior thickening properties when said polymers are dissolved in aqueous media. Particularly well-known for this purpose are the anionic polyacrylamides such as acrylamide/acrylic acid copolymers, including those prepared by hydrolysis of polyacrylamide. Such polymers are also very useful as fluid mobility control agents in enhanced oil recovery processes.

In the past, such polymers have been made available commercially as powders or finely divided solids which must be subsequently dissolved in an aqueous medium in order to be used. Because such dissolution steps are sometimes time consuming and often require rather expensive mixing equipment, it has become a common practice to formulate the water-soluble polymers in water-in-oil emulsions wherein the polymer is dissolved in the dispersed aqueous phase. Such emulsions, as well as methods for preparing them, are described in U.S. Pat. No. 3,284,393 to Vanderhoff et al. Unfortunately, for many applications, these emulsions do not invert as readily as desired. In order to accelerate the inversion rate of such emulsions, it has been a common practice, e.g., as shown in U.S. Pat. No. Re. 28,474, to add a water-soluble surfactant to the emulsion during or just prior to inversion. While the foregoing procedures generally do overcome the problems of dissolving dry powders of water-soluble polymers in aqueous media, such emulsions contain substantial quantities of water and oil, thus increasing the cost of shipping and handling such polymers to a significant degree.

In an attempt to overcome the latter problem, it is taught in U.S. Pat. No. 4,052,353 to concentrate such emulsions by removing water from the emulsions and subsequently adding sufficient water-soluble surfactant to render the water-soluble polymer self-dissolving in water. Unfortunately, however, the stability of such dispersions after storage for significant periods is not as much as desired.

In view of the foregoing deficiencies of conventional emulsions and concentrated dispersions derived from such emulsions, it is highly desirable to provide a concentrated water-in-oil emulsion of a water-soluble polymer that can be inverted quickly into an aqueous medium but can be stored for substantial periods of time without losing such ability to be inverted.

SUMMARY OF THE INVENTION

The present invention is such a concentrated stable emulsion that comprises (1) a discontinuous aqueous phase containing a water-soluble polymer and (2) a continuous oil phase containing an emulsifying amount of a water-in-oil emulsifier. For the purpose of this invention, the term "stable concentrated emulsion" means a water-in-oil emulsion wherein the concentration of polymer is in excess of 40 weight percent based on the weight percent of the emulsion and exhibits a percent compaction less than 10 percent after centrifugation at 2600 rpm at room temperature for one hour. In addition, the concentrated, stable emulsion of the present invention contains an amount of an inverting surfactant less than that which will destabilize the emulsion but sufficient to reduce the viscosity of the emulsion when compared to a concentrated emulsion that is equivalent in all respects except that it contains no inverting surfactant.

In another aspect, the present invention is a method for preparing a concentrated stable water-in-oil emulsion containing at least 40 weight percent of a water-soluble polymer which method comprises concentrating a stable water-in-oil, preconcentrate emulsion containing less water-soluble polymer than the concentrated emulsion in an aqueous phase which is dispersed in a continuous oil phase, said preconcentrate emulsion containing an emulsifying amount of a water-in-oil emulsifier and an amount of an inverting surfactant sufficient to reduce the bulk viscosity of the preconcentrate emulsion.

Preferably, this method for preparing the aforementioned concentrated emulsion comprises the steps of (1) forming a stable water-in-oil emulsion (monomeric precursor) containing at least one water-soluble monomer in the aqueous phase which is dispersed in the continuous oil phase, said emulsion containing an emulsifying amount of a water-in-oil emulsifier; (2) subjecting the monomeric precursor to conditions sufficient to polymerize the monomer to form a stable water-in-oil preconcentrate emulsion; and (3) concentrating the preconcentrate emulsion by removing at least a portion of the water from the emulsion. At some point prior to or during step (3) of the foregoing method, it is essential to add an amount of an inverting surfactant that is sufficient to reduce the viscosity of the preconcentrate emulsion but less than that which will destabilize the preconcentrate or concentrated emulsion. Preferably, the inverting surfactant is added prior to step (3).

Surprisingly, it is found that by adding a portion of inverting surfactant to the emulsion at some point prior to concentration of the emulsion to polymer solids of 40 weight percent or higher, the resulting concentrated emulsion is significantly more stable than an emulsion which is concentrated and then treated with inverting surfactant, e.g., by the procedure described in U.S. Pat. No. 4,052,353. The concentrated emulsions of this invention are superior to conventional emulsions in that they have increased polymer solids, reduced oil content, lower bulk viscosity and greater stability than are characteristic in the conventional emulsions containing about 30 weight percent of solids. These emulsions, although generally self-inverting upon the addition of water, are so stable that they can be stored for long periods of time and/or can undergo several freeze/thaw cycles without irreversible coagulation or precipitation. Most surprising is the ability of such concentrated emulsions to invert readily into aqueous media containing an inverting surfactant and substantial quantities, e.g., from about 0.0001 to about 20 weight percent, of dissolved salts which are commonly present in subterranean brines.

In addition to their utility as additives in drilling muds, fracturing fluids and fluid mobility control agents in enhanced oil recovery methods, the emulsions of the present invention are also useful as flocculating agents for sewages, industrial wastes, mining streams such as coal slurries and mining effluents, as thickeners for coating formulations and as additives for the manufacture of paper.

DETAILED DESCRIPTION OF THE ILLUSTRATIVE EMBODIMENTS

The present invention is practiced in the preparation of concentrated water-in-oil emulsions of any water-soluble polymer. Such concentrated emulsions are those wherein the dispersed phase is an aqueous phase having dissolved therein a water-soluble polymer and the continuous oil phase is a water-immiscible inert organic liquid. In this concentrated emulsion, the ratio of the aqueous phase to the oil phase is such that the concentrated emulsion contains at least 40 weight percent of the polymer provided that the resulting concentrated emulsion is stable. Advantageously, the concentrated emulsion contains from about 45 to about 80 weight percent of the polymer, preferably from about 50 to about 77 weight percent, most preferably from about 55 to about 72 weight percent. In the concentrated emulsions, the weight ratio of water to polymer is preferably from about 0.001:1 to about 0.77:1, most preferably from about 0.08:1 to about 0.25:1, and the weight ratio of oil to polymer is preferably from about 0.2:1 to about 0.68:1, most preferably from about 0.3:1 to about 0.6:1. Preferred concentrated emulsions have bulk viscosities (Brookfield RVT, ∩3 spindle, 10 rpm at 21° C.) less than 2000 centipoises (cps), more preferably less than 500 cps, most preferably less than 300 cps, said viscosity being measured at a polymer solids in the concentrated emulsion of 55 weight percent. The most preferred concentrated emulsions usually exhibit bulk viscosities (Brookfield RVT, #3 spindle, 10 rpm at $-23°$ C.) less than 2400 cps, preferably less than 2000 cps, most preferably less than 1500 cps, said viscosity being measured at a polymer solids in the concentrated emulsion of 54 weight percent.

For the purposes of this invention, the water-soluble polymer contained in the aqueous phase of the concentrated emulsion is one which forms a thermodynamically stable mixture when combined with water. These mixtures form spontaneously and include true solutions in which the individual polymer molecules are dispersed as well as micellular or colloidal solutions wherein the polymer molecules are aggregated to some extent, but wherein such aggregates are no larger than colloidal size. Accordingly, such water-soluble polymers are generally homopolymers and copolymers of water-soluble ethylenically unsaturated monomers.

Suitable water-soluble monomers include those that are sufficiently water-soluble to form at least a 10 weight percent solution when dissolved in water and readily undergo addition polymerization to form polymers that are water-soluble. Exemplary water-soluble monomers include ethylenically unsaturated amides such as acrylamide, methacrylamide and fumaramide; their N-substituted derivatives such as 2-acrylamide-2-methylpropane sulfonic acid (AMPS), N-(dimethylamino-methyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid; ethylenically unsaturated quaternary ammonium compounds such as vinylbenzyl trimethyl ammonium chloride, sulfoalkyl esters of unsaturated carboxylic acids such as 2-sulfoethyl methacrylate; aminoalkyl esters of unsaturated carboxylic acids such as 2-aminoethyl methacrylate and 2-(N,N-dimethylamino)ethyl methacrylate as well as the quaternized derivatives thereof such as acryloylethyl trimethyl ammonium chloride; vinyl amines such as vinyl pyridine and vinyl morpholine, diallyl amines and diallyl ammonium compounds such as diallyl dimethyl ammonium chloride; vinyl heterocyclic amides such as vinyl pyrrolidone; vinylaryl sulfonates such as vinylbenzyl sulfonate as well as the salts of the foregoing monomers. Of the foregoing water-soluble monomers, acrylamide and combinations of acrylamide and acrylic acid are preferred. Acrylamide and combinations thereof with up to 50 mole percent of other water-soluble monomers, based on total water-soluble monomer, are more preferred. Most preferred are polymers wherein the water-soluble monomer is acrylamide and a mixture of from about 60 to about 99 mole percent of acrylamide with from about 1 to about 40 mole percent of other water-soluble monomers.

The molecular weight of the water-soluble polymer is not particularly critical and may vary over a wide range from about 1 to about 25 million. Preferred polymers have weight average molecular weight in the range from about 2 to about 10 million.

The water-immiscible oil phase of the concentrated emulsion generally comprises at least one inert hydrophobic liquid. Usually such liquid is an organic liquid such as a liquid hydrocarbon or substituted hydrocarbon. Preferred organic liquids are the halogenated hydrocarbons such as perchloroethylene, methylene chloride and the like as well as liquid hydrocarbon having from 4 to 15 carbons per molecule including aromatic and aliphatic hydrocarbons and mixtures thereof, e.g., benzene, xylene, toluene, mineral oils, liquid paraffins such as kerosene, naphtha and the like. Of the foregoing organic liquids, the hydrocarbons are the more preferred, with aliphatic hydrocarbons being most preferred.

The concentrated emulsions of the present invention are prepared from water-in-oil emulsions of water-soluble polymers which emulsions contain an inverting surfactant. In general, such water-in-oil emulsions are prepared by following the general procedure described in the prior art as exemplified in U.S. Pat. Nos. 3,284,393; 3,624,019 and 3,734,873, which are hereby incorporated by reference. In such methods, an aqueous solution of water-soluble, ethylenically unsaturated monomer(s) is dispersed in the inert hydrophobic organic liquid containing a sufficient amount of a water-in-oil emulsifying agent to form a water-in-oil emulsion of the water-soluble monomer (monomeric precursor).

Emulsifiers suitably employed for purposes of emulsifying the aqueous phase containing the water-soluble monomer in the organic liquid are those emulsifiers that promote the formation and stabilization of water-in-oil emulsions. Normally such emulsifiers have a hydrophilic-lipophilic balance (HLB) in the range from about 2 to about 9, most preferably from about 3 to about 6. Preferably, the emulsifying agent is sorbitan monooleate, the reaction product of oleic acid with isopropanolamide or a mixture thereof. Other suitable emulsifying agents include hexadecyl sodium phthalate, decyl sodium phthalate, octadecyl sodium phthalate, sorbitan monooleate, sorbitan stearate, glycerine mono- or distearate and combinations of such emulsifying agents. Generally, the emulsifier is used in amounts sufficient to provide the desired water-in-oil emulsion. This amount is normally in the range from about 0.1 to about 20, preferably from about 3 to about 5, weight percent based on the weight of monomer.

As mentioned hereinbefore, polymerization of the water-in-oil emulsion of the water-soluble monomers is advantageously effected under conventional conditions such as described in U.S. Pat. No. 3,284,393. Normally such polymerization is practiced in the presence of a polymerization initiator capable of generating free-radicals. Preferably, this free-radical initiator is employed in amounts from about 0.01 to about 0.1 weight percent of initiator based on the monomers. Exemplary polymerization initiators include the inorganic persulfates such as potassium persulfate, ammonium persulfate and sodium persulfate, azo catalysts such as azobisisobutyronitrile and dimethylazoisobutyrate; organic peroxygen compounds such as benzyl peroxide, t-butylperoxide, diisopropylbenzene hydroperoxide and t-butyl hydroperoxide. Of these initiators, the organic types such as t-butyl hydroperoxide are preferred. In addition to the aforementioned ingredients, the emulsion polymerization recipe optionally includes chain transfer agents, chelating agents, buffers, salts, and the like.

At some point prior to concentration of the emulsion to polymer solids above 40 weight percent based on the emulsion, an inverting surfactant is incorporated into the preconcentrate emulsions in an amount that is sufficient to lower the bulk viscosity of emulsion to a value that is 5 percent lower than the bulk viscosity of the emulsion prior to addition of the surfactant, provided that said amount is less than that which destabilizes the emulsion during concentration. Preferably, the surfactant is added to the preconcentrate emulsion in an amount sufficient to reduce its bulk viscosity by at least 15 percent, most preferably at least 30 percent. By "destabilizing the emulsion" is meant that the water-in-oil emulsion of water-soluble polymer separates into two phases having a single interface or inverts into an oil-in-water emulsion. Preferably, said amount of inverting surfactant that is added prior to concentration is in the range from about 1 to about 100 weight percent based on the weight of the water-in-oil emulsifier used, more preferably from about 1 to about 80 weight percent, most preferably from about 10 to about 75 weight percent. It is most preferred to add the inverting surfactant prior to polymerization.

In a less preferred embodiment of this invention, an initial portion of inverting surfactant is added to the monomeric precursor, or it is added to the aqueous phase or oil phase prior to formation of the monomeric precursor, so long as it is present in the monomeric precursor prior to the completion of polymerization. Such initial portion of inverting surfactant is usually an amount in the range from about 0.1 to about 50 weight percent based on the weight of water-in-oil emulsifier used, most preferably from about 0.1 to about 33 weight percent. The resulting stable water-in-oil emulsion of monomer (monomeric precursor) is then subjected to free-radical forming conditions in order to polymerize the monomer in the dispersed phase to form a water-in-oil emulsion of the water-soluble polymer. Subsequent to polymerization and prior to concentration, this water-in-oil emulsion which already contains an initial portion of inverting surfactant is combined with additional inverting surfactant which may or may not be the same as the inverting surfactant added prior to polymerization. This postadded inverting surfactant is added in an amount sufficient to enhance the invertibility of the emulsion, but not enough to destabilize the emulsion. Preferably, this amount of inverting surfactant added after polymerization is in the range from about 0.1 to about 80, most preferably from about 10 to about 75, weight percent based on the weight of water-in-oil emulsifier used.

Also, in a lesser preferred embodiment wherein no inverting surfactant is added prior to polymerization, the inverting surfactant is added to the water-in-oil emulsion of water-soluble polymer prior to concentration (herein called a preconcentrate emulsion). When added in this manner, the inverting surfactant is added in an amount sufficient to lower the bulk viscosity of the preconcentrate emulsion, but not enough to destabilize it. Preferably, such an amount of inverting surfactant is in the range from about 1 to about 100, more preferably, from about 1 to about 80, most preferably from about 10 to about 75, weight percent based on the weight of the water-in-oil emulsifier employed to prepare the emulsion. In the least preferred, but suitable embodiment of this invention, the inverting surfactant is added during the concentration step before the polymer solids of the emulsion reaches 40 weight percent.

Inverting surfactants suitably employed in the practice of this invention are generally those that promote the formation of oil-in-water emulsions or dispersions when the water-in-oil emulsion is combined with sufficient water to form a continuous aqueous phase. Generally, such inverting surfactants are water-soluble compounds having an HLB in the range from about 6.5 to about 20, preferably from about 10 to about 14. Examples of such inverting surfactants include nonionic, anionic, cationic or amphoteric surfactants with nonionic surfactants being preferred.

Preferred nonionic surfactants include (1) alkyl polyethyleneoxy compounds such as alkyl polyethyleneoxy alcohol represented by the formula:

R—(EO)$_n$—H wherein R is C$_4$–C$_{20}$ alkyl, EO is ethyleneoxy and n is a number from 1 to 10 and (2) nonionic surfactants such as the reaction products of ethylene oxide or mixtures of ethylene oxide and higher alkylene oxide with active hydrogen compounds such as phenols, alcohols, carboxylic acids and amines, e.g., alkylphenoxyethyleneoxy alcohols and alkylphenoxy polyethyleneoxy alcohols.

Also suitable are anionic compounds represented by the formula:

R—X wherein R is as defined hereinbefore and X is SO$_3$H, CO$_2$H or PO$_3$H and salts thereof. Examples include long chain carboxylates such as potassium oleate, sodium laurate, potassium stearate, potassium caprolate, sodium palmatate and the like; alkali metal alkylbenzene sulfonates such as sodium nonylbenzene sulfonate and potassium dodecylbenzene sulfonate; alkali metal alkyl sulfates such as sodium dodecyl sulfate and alkali metal dialkyl sulfosuccinates such as sodium dihexyl sulfosuccinate and sodium dioctyl sulfosuccinate; salts of resin acids such as abietic acid and dihydroabietic acid.

Also suitable are cationic surfactants such as alkyl ammonium or quaternary ammonium salts, e.g., dodecyl ammonium hydrochloride, dodecyl trimethyl quaternary ammonium chloride and the like, and ethoxylated fatty amines. Other suitable surfactants are described in McCutcheon's *Detergents and Emulsifiers*, North American Edition, 1980 Annual. Also included in the aforementioned surfactants are oligomeric and polymerizable surfactants described at pages 319–322 of Blackley, *Emulsion Polymerization*, Halsted Press (1975). Examples of such oligomers include ammonium and alkali metal salts of functionalized oligomers sold by Uniroyal Chemical under the trade name "Polywet" and copolymers of acrylonitrile and acrylic acid having molecular weights less than 2000 which are prepared in the presence of chain terminating agents such as n-octyl mercaptan. Examples of polymerizable surfactants include sodium salts of 9- and 10-(acryloylamido)-stearic acid and the like.

Of the foregoing surfactants, the nonionic types are preferred, with ethoxylated alkyl phenols and ethoxylated fatty alcohols being most preferred.

In concentrating the emulsions containing the inverting surfactant, the emulsion is subjected to conditions such that a significant part of water and other volatiles are removed from the emulsion. Such volatilizing conditions may involve heating and/or subjecting the emulsion to reduced pressure in order to volatilize the components to be removed. Preferably, concentration is achieved by subjecting the emulsion to temperatures from about 0.1° to about 120° C., most preferably from 5° to 100° C. and pressures from about 0 to about 70, most preferably from 0 to 60, millimeters (mm) of mercury. It is understood that the volatiles to be removed may be entirely water or a mixture of water and oil. It is further understood that it is not necessary to maintain any particular water to oil ratio in the emulsion during or subsequent to removal of the volatiles. In general, it is found that the concentrated emulsions of the present invention have lower viscosities than those prepared by other techniques. Accordingly, heat is transferred more efficiently during the concentration of emulsions by the method of this invention than by conventional concentration methods.

These concentrated emulsions are generally self-inverting in that they invert readily when they are dispersed into water without adding additional inverting surfactant. They are particularly effective for the inversion into aqueous media containing from about 0.0001 to about 20, especially from about 0.001 to about 5 weight percent of dissolved salts such as sodium chloride, calcium chloride, magnesium chloride and the like that are normally present in subterranean brines. When inverting the concentrated emulsions of this invention into more concentrated brines, it is often desirable to add additional inverting surfactant to the concentrated emulsion or to the brine just prior to inversion.

The following examples are given to illustrate the invention and should not be construed as limiting its scope. Unless otherwise indicated, all parts and percentages are by weight.

EXAMPLE 1

Preparation of Preconcentrate Emulsion

A water-in-oil emulsion of an acrylamide/acrylic acid copolymer is prepared by dissolving 334.5 g of acrylamide and 138.3 g of acrylic acid in 302.5 g of water. The pH of the resulting aqueous solution is adjusted to 6.5 by the addition of a 50 percent aqueous solution of NaOH. To this solution is added 0.3 g of the pentasodium salt of diethylenetriaminepentaacetic acid and 5.1 g of a polyethylene glycol ether of a secondary alcohol sold by Union Carbide under the trade name Tergitol 15-S-9 (inverting surfactant). The total weight of this aqueous phase is adjusted to 1260 g by the addition of water. This aqueous phase is then dispersed in an oil phase which contains 457.8 g of liquid hydrocarbon, 12.3 g of isopropanolamide of oleic acid (emulsifier) and 10.2 g of sorbitan monooleate (emulsifier). The resulting emulsion is charged into a jacketed liter glass reactor equipped with a stirrer, a nitrogen sparger, a thermometer, and gas exit. A free-radical initiator is added and the reactor containing the emulsion is sparged with nitrogen for about 1 hour to remove oxygen. The emulsion is then subjected to polymerization conditions as described in U.S. Pat. No. 3,284,393 to form a water-in-oil emulsion of acrylamide/acrylic acid copolymer (preconcentrate emulsion).

Concentration of Preconcentrate Emulsion

A. Into a 2 liter, jacketed, glass vessel equipped with a mechanical stirrer, a thermocouple, feed port, condenser, receivers and a vacuum system is charged 1700 g of the aforementioned preconcentrate emulsion. The pressure within the vessel is reduced to 30 mm of mercury absolute while stirring the contents of the vessel. During this time, heat is applied to increase the temperature of the emulsion to ~30° C. at which point boiling begins. Water vapor and volatilized oil are condensed and collected until the concentration of polymer in the emulsion reaches ~56 percent. During the concentration procedure, the temperature of the contents increases from 32° to 70° C. The resulting concentrated emulsion (Sample No. 1) is tested for bulk viscosity and percent compaction. The results of these tests are reported in Table I.

B. Following a somewhat different procedure, the foregoing glass vessel is charged with 1000 g of the aforementioned preconcentrate emulsion and stirring of the contents is begun. The pressure inside the vessel is reduced to 20 mm of mercury absolute and the emulsion is brought to boiling by heating. The liquid level in the vessel is noted and fresh preconcentrate emulsion is fed into the vessel to maintain the level at its initial point until the emulsion is concentrated to 57 percent polymer solids. The resulting concentrated emulsion (Sample No. 2) is withdrawn from the vessel and tested and the results of these tests are reported in Table I.

C. By a continuous procedure, the aforementioned glass vessel is charged with 1000 g of concentrated emulsion having a solids content of 56 percent. The vessel is modified in that preconcentrate emulsion can be continuously added to the vessel while concentrated product is continuously withdrawn. The pressure in the vessel is adjusted to about 20 mm of mercury absolute and the emulsion is heated to its boiling point of approximately 65° C. Preconcentrate emulsion is metered into the vessel while concentrated emulsion is withdrawn in a calculated ratio such that the liquid level and solids content remain approximately constant. Operating the concentration procedure in this continuous fashion causes the water to oil ratio of distilled volatiles to decrease at the temperature and pressure used in the aforementioned procedures. As a result, the concentrated product has a polymer solids concentration of 59 percent. Accordingly, oil content in the concentrated emulsion can be reduced without increasing the temperature or lowering the pressure. The resulting concentrated emulsion (Sample No. 3) having a polymer solids of 59 percent is tested and the results are similarly reported in Table I.

D. For purposes of comparison, the aforementioned batch procedure used to prepare Sample No. 1 is employed to prepare a concentrated emulsion which is similar in all respects to the emulsion of Sample No. 1 except that no inverting surfactant is added prior to or during concentration. The emulsion is concentrated to about 53.5 percent polymer solids and 1 weight percent of the inverting surfactant is added to the concentrated emulsion. The resulting concentrated emulsion (Sample No. $C_1$) is tested and the results are reported in Table I.

E. Also for purposes of comparison, a concentrated emulsion is prepared according to the procedure used to prepare Sample No. 1 except that no inverting surfactant is employed at any time prior to testing for bulk viscosity and percent compaction. This control emulsion (Sample No. $C_2$) is similarly tested and the results are reported in Table I.

F. Also for comparison, the preconcentrate emulsion (Sample No. $C_3$) prepared by the procedure described in the preparation of emulsions of this example is tested for bulk viscosity and percent compaction. The results of these tests are also reported in Table 1.

smaller weight percent of water-soluble polymer than the weight percent thereof in the concentrated emulsion, (2) an emulsifying amount of a water-in-oil emulsifier and (3) an amount of an inverting surfactant sufficient to reduce the bulk viscosity of the preconcentrate emulsion, thereby forming the stable concentrated emulsion.

2. The method of claim 1 which method comprises the steps of (1) forming a stable water-in-oil emulsion containing at least one water-soluble monomer in an aqueous phase which is dispersed in a continuous oil phase, said emulsion of monomer containing an emulsifying amount of a water-in-oil emulsifier; (2) subjecting said emulsion of monomer to conditions sufficient to polymerize the monomer thereby forming a stable water-in-oil preconcentrate emulsion of a water-soluble polymer; and (3) concentrating said preconcentrate emulsion by removing at least a portion of the water from the preconcentrate emulsion provided that prior to or during step (3) an inverting surfactant is added in an amount sufficient to reduce the bulk viscosity of the preconcentrate emulsion, but less than that which destabilizes the preconcentrate emulsion or the concentrated emulsion.

3. The method of claim 1 wherein the inverting surfactant is added prior to step (2).

4. The method of claim 3 wherein the inverting surfactant is added to the aqueous phase prior to or during

TABLE I

| Sample No. | Inverting Surfactant (1) | | | | Polymer Solids (2) % | Bulk Viscosity (3) cps | | | % Compaction (4) 60 min |
|---|---|---|---|---|---|---|---|---|---|
| | Type | Amount, % (Time of Addition) | | | | BC | DC | AC | |
| | | Pre-Polym | Post-Polym | Post-Conc | | | | | |
| 1 | 15-S-9 | 1 (25) | 0 | 0 | 56 | 640 | 75 | 75 | 1.6 |
| 2 | 15-S-9 | 1 (25) | 0 | 0 | 57 | 640 | 70 | 70 | 1.8 |
| 3 | 15-S-9 | 1 (25) | 0 | 0 | 59 | 640 | 70 | 210 | 1.8 |
| $C_1$* | 15-S-9 | 0 | 0 | 1 (25) | 53.4 | 940 | 490 | 490 (140) | 2.4 |
| $C_2$* | None | 0 | 0 | 0 | 53.5 | 940 | 490 | 490 | 3.6 |
| $C_3$* | 15-S-9 | 1 (25) | 0 | — | 31.6 | 640 | — | — | 3.7 |

*Not an example of the invention.
(1) 15-S-9 is Tergitol 15-S-9 (HLB = 13.5) sold by Union Carbide
Pre-Polym indicates the amount, weight percent based on monomer (weight percent based on total water-in-oil emulsifier) of inverting surfactant added prior to polymerization.
Post-Polym indicates the amount of inverting surfactant added after polymerization.
Post-Conc indicates the amount of inverting surfactant added after concentration.
(2) Polymer Solids is weight percent of water-soluble polymer based on the weight of the emulsion subjected to the indicated tests.
(3) Bulk Viscosity is determined on Brookfield RVT viscometer with a #3 spindle operating at 10 rpm and 21° C.
BC — Before concentration.
DC — During concentration when polymer solids reaches 48 percent.
AC — After concentration. In Sample No. $C_1$, the concentrated emulsion has a bulk viscosity of 490 cps prior to the addition of inverting surfactant and a bulk viscosity of 140 cps after addition of inverting surfactant.
(4) % Compaction is determined by (1) charging a 50 ml graduated centrifuge tube with 40 ml of concentrated emulsion, (2) capping the tube and (3) spinning the tube at 2600 rpm for the time indicated in a Damon IEC Centrifuge Model NH-SII. After the indicated time (60 minutes), the amount of clear layer is observed. The amount of compacted material is then observed by inverting the tube and allowing the liquid material to drain away from compacted material until the level of compacted material can be determined.

As evidenced by the data in Table I, the addition of invertinq surfactant prior to concentration (Sample Nos. 1–3) results in concentrated emulsions having bulk viscosities and percent compactions lower than a concentrated emulsion prepared by adding the inverting surfactant after concentration (Sample No. $C_1$) The difference in results is particularly surprising in view of the fact that the polymer solids of Sample Nos. 1–3 are greater than those of Sample Nos. $C_1$–$C_3$.

What is claimed is:

1. A method for preparing a concentrated stable water-in-oil emulsion containing at least 40 weight percent of a water-soluble polymer which method comprises concentrating a stable preconcentrate water-in-oil emulsion containing a water-soluble polymer in an aqueous phase which is dispersed in a continuous oil phase, said preconcentrate emulsion containing (1) a the formation of the emulsion of monomer.

5. The method of claim 3 wherein the inverting surfactant is added to the emulsion of monomer.

6. A method of claim 3 wherein the inverting surfactant is added to the aqueous phase prior to or during the formation of the emulsion of monomer, and additional inverting surfactant is added during step (3) but before the emulsion is concentrated to a polymer solids of 40 weight percent.

7. The method of claim 1, 2, 3 or 4 wherein the water-soluble monomer is acrylamide or a mixture of acrylamide and acrylic acid.

8. The method of claim 7 wherein the amount of inverting surfactant is from about 10 to about 75 weight percent of the weight of water-in-oil emulsifier.

9. The method of claim 1 wherein the inverting surfactant is added to the preconcentrate emulsion.

10. The method of claim 1 wherein the inverting surfactant is added during step (3) but before the emulsion is concentrated to a polymer solids of 40 weight percent.

11. The method of claim 1 wherein the concentration of polymer in the concentrated emulsion is from about 50 to about 77 weight percent of the concentrated emulsion.

12. A method of claim 1 wherein said concentrated emulsion comprises a weight ratio of polymer to water of from about 0.05:1 to about 0.25:1.

13. A method for preparing a concentrated stable water-in-oil emulsion containing at least 40 weight percent of a water-soluble polymer which method comprises concentrating a stable preconcentrate water-in-oil emulsion containing a water-soluble polymer in an aqueous phase which is dispersed in a continuous oil phase, said preconcentrate emulsion containing (1) a smaller weight percent of water-soluble polymer than the weight percent thereof in the concentrated emulsion, (2) an emulsifying amount of at least two water-in-oil emulsifiers and (3) an amount of an inverting surfactant sufficient to reduce the bulk viscosity of the preconcentrate emulsion, thereby forming the stable concentrated emulsion.

14. A method of claim 13 wherein said concentrated emulsion comprises a weight ratio of polymer to water of from about 0.05:1 to about 0.25:1.

* * * * *